Nov. 11, 1952

G. W. IVERSON 2,617,242

HYDRAULIC RAM FOR RAISING SICKLE BARS

Filed Nov. 20, 1947

INVENTOR.
George W. Iverson.
BY
Thiess, Olsen & Mecklenburger.
Attys.

Nov. 11, 1952     G. W. IVERSON     2,617,242
HYDRAULIC RAM FOR RAISING SICKLE BARS
Filed Nov. 20, 1947     4 Sheets-Sheet 2

INVENTOR.
George W. Iverson

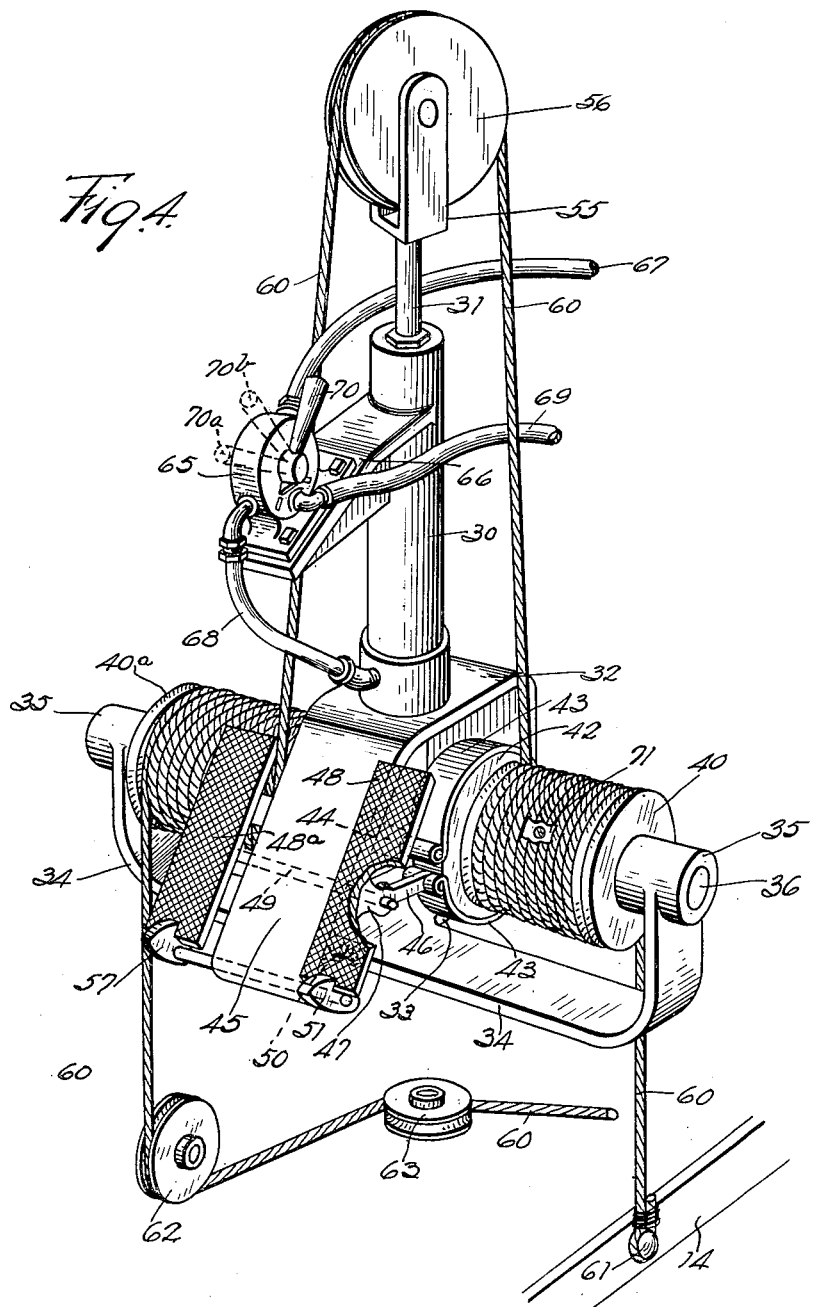

Patented Nov. 11, 1952

2,617,242

UNITED STATES PATENT OFFICE 2,617,242

HYDRAULIC RAM FOR RAISING SICKLE BARS

George W. Iverson, Racine, Wis., assignor to J. I. Case Company, Racine, Wis., a corporation of Wisconsin Application November 20, 1947, Serial No. 787,191

5 Claims. (Cl. 56—25)

This invention relates particularly to hydraulic lifts for mowers and the like, an object being to provide a single hydraulic ram operated by a pump on the tractor with dual control to lift the cutter bar or the shoe of the mower independently of each other or simultaneously.

A further object is to provide a single hydraulic ram and transmission having a dual control or divided power flow for moving or actuating, simultaneously or independently, two members or elements of a machine, such, for example, as the shoe and the cutter bar of a mower, or the like.

Further objects and advantages will appear from the description and claims to follow, in connection with the accompanying drawings which illustrate, by way of example but not of limitation, an embodiment of the invention, and in which—

Fig. 4 is a perspective view of the hydraulic lift by itself.

Figure 1:
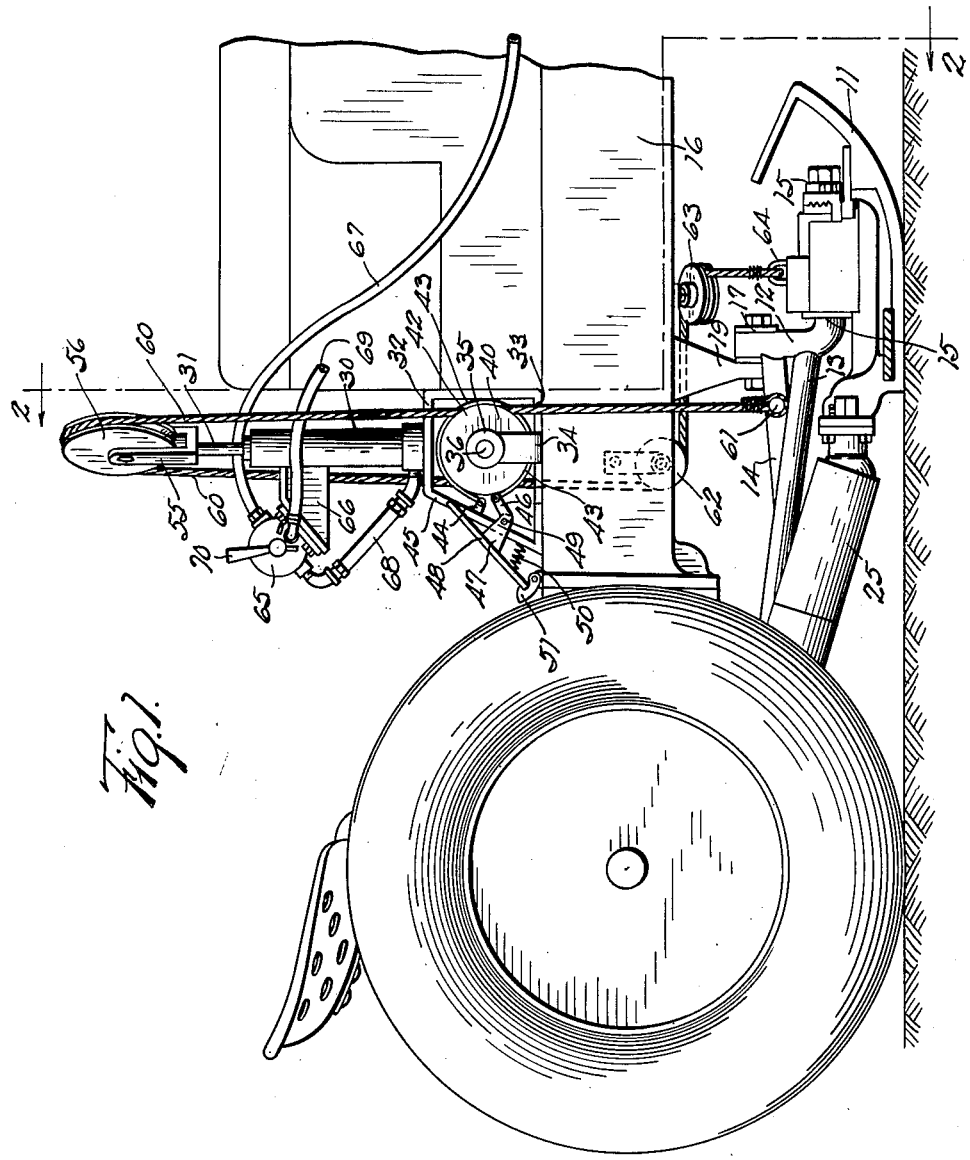
Fig. 1 is a side elevation of a tractor mower with the hydraulic lift applied thereto, the rear part only of the tractor being shown.

The particular machine to which the lift is here shown applied is a tractor mower of well-known type, construction and operation, having the usual sickle or cutter bar 10 with inner shoe and associated parts 11 suitably attached to the tractor by a frame consisting of the bar 12, perpendicular to the side of the tractor, the diagonal brace bar 13 secured to the bar 12 near its outer end and the cross bar 14 joining the bars 12 and 13. The outer end of bar 12 is bent forwardly and forms a pivotal or journaled bearing 15 with the shoe structure about which the cutter bar and shoe may tilt, pivot or swing vertically, as desired. The inner ends of bars 12 and 13 are connected respectively to the frame 16 of the tractor by bearings 17 and 18 on brackets 19 and 20 depending from the frame 16. These bearings 17 and 18 permit the outer end of the frame 12—13—14 to be raised and lowered within limits as desired, bodily to raise and lower the shoe 11, and the bearing 15 permits the cutter bar to be raised or lowered or swung from the horizontal position to any desired angular position within the limits of the machine—usually from vertically up to 45° down below horizontal.

Figure 2:
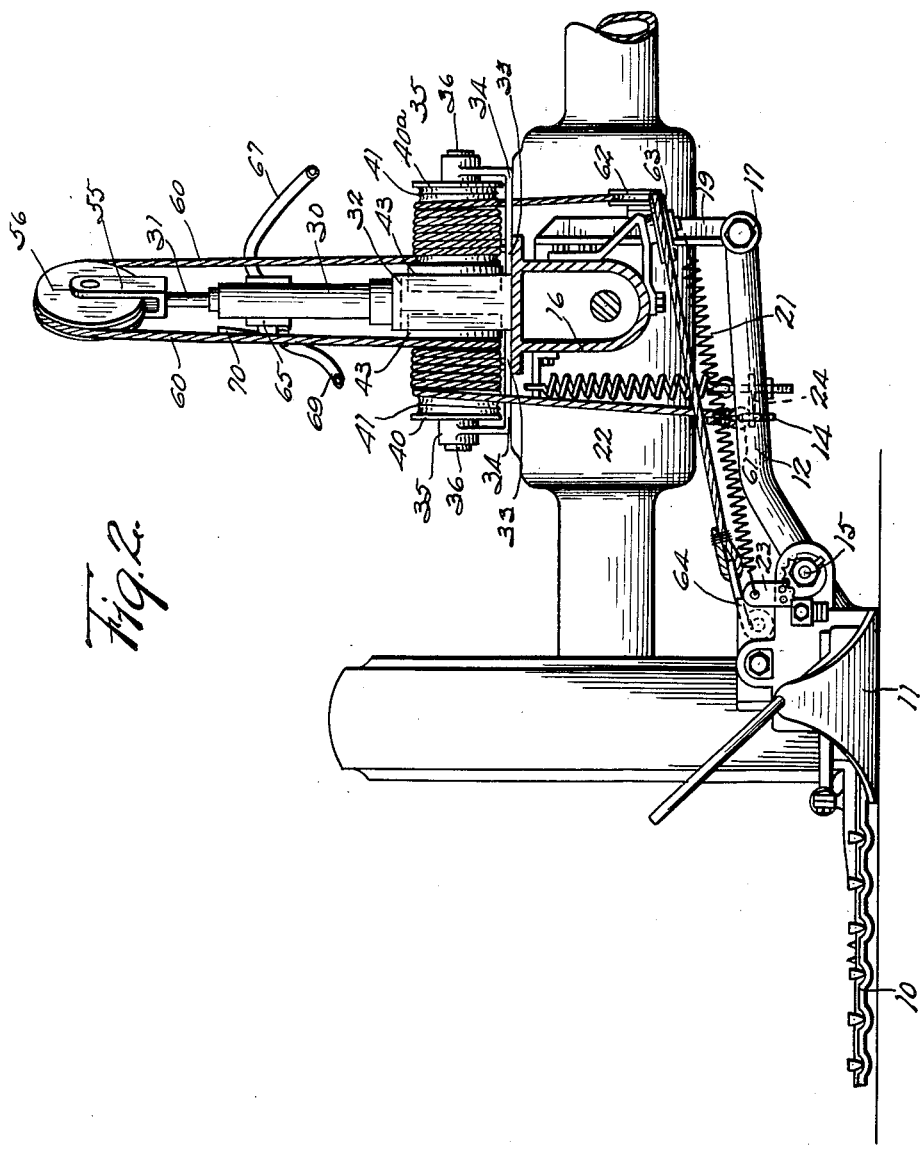
Fig. 2 is a front elevation of the same, the tractor frame being in section on the line 2—2 of Fig. 1.

The weight of these parts may be counterbalanced to the desired extent by suitable coiled springs 21 and 22, Fig. 2, extending from brackets on the frame 16 of the tractor to connections on the pivoted parts, such as the upstanding lug or bracket 23 of the cutter bar and shoe structure and the bracket 24 shown in dotted lines on the brace bar 14 of the pivoted frame 12—13—14 connected to the shoe. The excess weight is handled by the lifting mechanism, to be described.

The pitman rod and mechanism for reciprocating the sickle or knife in the cutter bar are located in parts carried by the shoe 11 in the usual manner and may be connected by drive shaft and universal joints in an enclosing sheath 25 with a suitable transmission to the power take-off of the tractor.

The lifting mechanism may comprise a hydraulic ram preferably in the form of a hydraulic cylinder 30 having the usual piston therein and piston rod 31 secured to and actuated by the piston and leading to the exterior of the cylinder.

This cylinder is firmly mounted on a rigid base 32 which may be in the form of an open frame, the lower side 33 of which is secured, as by bolts or otherwise, to the frame 16 of the tractor as indicated.

The bottom member 33 of this base frame 32 may be provided with lateral extensions 34 with their outer ends turned up to support bearing or supporting bosses 35 for a shaft 36 extending from one bearing 35 to the other and through the opening of the cylinder base frame 32.

A cable winding drum or winch 40, 40a is rotatively located on each end of this shaft 36 as indicated, the surface of which is preferably spirally grooved from end to end, as indicated at 41, for the reception of the lifting cable therein, as later explained, the groove on one drum being a right-hand spiral and that on the other drum being a left-hand spiral.

The inner end of each of these winding drums or winches 40 may be provided with a braking surface or brake drum 42 which is encircled by a suitable brake band 43. The one end of this brake band 43 may be secured stationarily with respect to the drum 42 by a suitable pin or support 44 on the inside face of the sloping end 45 of the base frame 32, while the other free end of the brake band is operatively secured to an extension 46 of the pedal supporting bracket 47, which is attached to the back of the foot pedal 48, 48a and supports the same for pedal action.

Both of the pedals 48, 48a one on either side of the sloping end 45 of the cylinder supporting base, are mounted for pivotal or rocking action on the ends of rod or shaft 49 suitably supported on brackets on the inner face of the sloping end 45 of the base frame.

A spring 50 under each pedal tends to force the lower end of the pedal outwardly and in a direction to loosen the brake on the drum. Suitable spring biased catches 51 engage and hold the pedals when in completely compressed positions with the brakes 43 tightly holding the drums. The catch may be released by the heel of the foot.

These winches or winding drums, brakes, pedals, etc., are the same in construction, and operation on both sides of the base frame and are independently operative. The rocking of either pedal forward at the top loosens the brake on the drum on that side of the lift, and the reverse rocking of the pedal tightens the brake and retards or stops the drum. The drum may be locked in any desired stopped position by engaging the pedal by the hook or catch 51.

The hydraulic piston rod 31 in the form of ram here shown may terminate in a fork 55 in which is journaled a sheave or pulley 56 having a grooved periphery for the reception of a lifting or pulling cable 60 which passes over the sheave 56 and thence by its dual branches down to the drums 40, one flight or branch of the cable being wrapped several times around the drum on that side of the lift and the other flight or branch of the cable being similarly wound around the drum on its side of the lift.

From the drums, suitable cables, preferably the same cable 60, extend to the respective members or elements of the machine to be operated or lifted. Thus, the end of the cable 60 from the drum 40 on the right of the lift may pass directly down and be suitably secured, as at 61, to the rod 14 of the A-frame, consisting of rods 12, 13 and 14, which frame attaches the shoe and cutter bar construction to the tractor body as explained. The end of the cable 60 from the other drum 40, the one at the left, may extend down around directional or guiding pulleys or sheaves 62 and 63 suitably secured by brackets to the tractor frame 16 and thence to the cutter bar construction, where it may be attached, as by a connection 64, to the mower cutter bar and shoe construction. Accordingly, the winding up of these cable ends on the drums 40 will, in the case of the right drum, lift the mower shoe from the ground, and in the case of the left-hand drum will tilt the cutter bar at an angle, that is, rock or pivot it about the journal or bearing 15.

A hand control valve 65 of conventional construction, connection and arrangement may be located on a suitable bracket 66 on the side of the cylinder 30, or other location convenient to the operator of the tractor, to control the operation of the hydraulic cylinder or ram 30. The fluid under pressure comes from the tractor-operated pump (not shown) through the hose 67 to the valve. The valve is connected by hose 68 to the base of cylinder 30 under the piston therein. The valve is also connected by return hose 69 back to the pump sump. The valve handle 70 has three main positions, that in full lines in Fig. 4 being the off position in which the flow from the pump through hose 67 is allowed to flow into hose 69 and then into the sump. This setting of handle 70 permits the piston in the cylinder to return to its lowest position under the weight of the parts attached to the cable 60, the fluid being forced by the piston out of the cylinder and through the hose 68, the valve 65 and return pipe 69 to the sump. The rearward dotted-line position of the handle 70a connects the pressure line 67 with the hose 68 through the valve and closes the sump passage 69, whereby the cylinder is operated by pressure from the pump and the parts connected with the cable may be lifted. The intermediate handle position 70b closes the passage to hose 68 and the cylinder, while opening the hose 67 to the return pipe 69. This holds the pressure in hose 68 and in the cylinder, and the piston is stopped and held at any desired point.

Thus, through the medium of a single hydraulic ram or cylinder, the operator has complete control over the two independent members. If he wishes merely to lift the shoe 11 about the bearings 17 and 18, for instance, he presses the lower end of the left foot pedal 48a forwardly to apply the brake 43 to the left drum 40 to prevent its turning, locking it if desired, and moves the valve handle 70 over into position 70a to admit the fluid to the cylinder. This raises the sheave 56 into the bight of the cable 60, and since the left flight or branch of the cable is held stationary by the drum, the right branch pulls up on the right drum 40, causing it to rotate and to wind up the lower end portion of the cable on the other end of the drum, thereby lifting the shoe to which said end of the cable is attached.

The shoe may be lowered independently in the same way by setting the valve handle to the off position, as shown in full lines, the weight of the shoe causing the return of the parts to normal, as above explained.

If the shoe is to be maintained in elevated position, the left pedal may be locked by the catch 51 in brake clamping or holding position, the valve being in intermediate position, or both pedals may be locked.

If the operator wishes merely to tilt or rock up the cutter bar 10 or raise it to any angle, he follows the same procedure except that he uses the right pedal to brake and hold the right drum 40. This in a similar manner causes the sheave 56 to impart a pulling movement to the left flight of the cable which rotates the left drum 40 and winds up a corresponding number of turns of the end portion of the cable on that drum and thereby rocks or tilts the cutter bar 10 about the bearing 15 to any desired angle.

The cutter bar may be independently lowered by shifting the valve to the off position, or it may be held in any desired position by moving the valve to the intermediate position and preferably locking the foot pedal or both in that position.

The two members or elements of the machine may be moved together and simultaneously, if desired, by the operation of the valve either alone or accompanied by such control by either or both brakes by the pedals as may be desirable at the time. They can be locked in the desired position by both pedals and catches 51.

The retarding or stopping of the motion of one of the branches of the cable over the sheave 56 results in accelerating the movement of the other flight, with the same movement of the sheave.

The operator of the mower thus with the one cylinder has complete and independent control of the shoe and cutter bar from his seat on the tractor and without the strenuous operation of levers or the like, or the presence of complicated apparatus.

Figure 3:
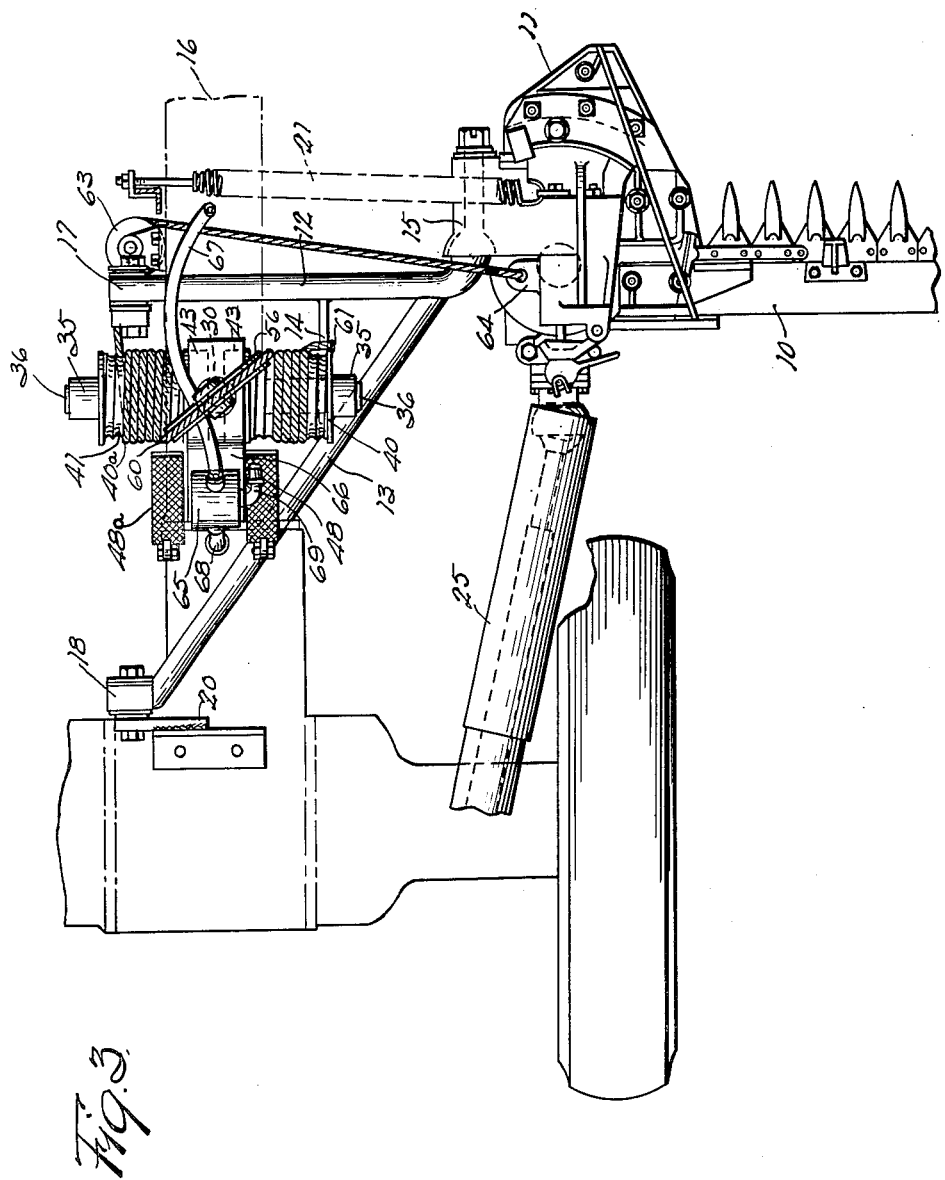
Fig. 3 is a plan view of the same.

The winding of the cable branches on the drums on opposite sides thereof prevents side strains on the sheave, cylinder or piston, the sheave 56 being free to turn into the plane of the branches as more clearly indicated in the plan view of the Fig. 3, and the cables to be substantially parallel, and the strain on the supporting base structure of the cylinder due to the pull and weight on the descending ends of the cable is confined to the base. Any tendency of the cable to slip on the drums may be overcome by a simple clip 71 secured, as by a screw, to the drums midway of their length and overlapping a couple of turns of the cable.

While but one embodiment of the invention has been shown, it is appreciated that various changes and alterations may be made therein without departing from the scope or principle of the same, as set forth or intended to be set forth in the appended claims.

I claim:

1. The combination with a mobile vehicle frame, of a support bar pivotally connected to said frame, a sickle bar pivotally connected to said support bar, a hydraulic ram mounted on said frame, said ram having a cylinder, a piston operating therein, and a piston rod, a two-way power flow dividing device operatively connected to said rod, two force transmitting elements operatively connected to said two-way power flow dividing device, one of said force transmitting elements being connected to said sickle bar and the other of said elements being connected to said support bar, and power flow diminishing means operatively connected to each of said force transmitting means.

2. The combination with a mobile vehicle frame, of a support bar pivotally connected to said frame, a sickle bar pivotally connected to said support bar, a hydraulic ram mounted on said frame, said ram having a cylinder, a piston operating therein, and a piston rod, a two-way power flow dividing device operatively connected to said rod, two force transmitting elements operatively connected to said two-way power flow dividing device, one of said force transmitting elements being connected to said sickle bar and the other of said elements being connected to said support bar, and power flow diminishing means operatively connected to each of said force transmitting means, said power flow dividing device comprising a pulley mounted on said piston rod, said force transmitting elements comprising an elongated flexible tension member looped over said pulley.

3. The combination with a mobile vehicle frame, of a support bar pivotally connected to said frame, a sickle bar pivotally connected to said support bar, a hydraulic ram mounted on said frame, said ram having a cylinder, a piston operating therein, and a piston rod, a two-way power flow dividing device operatively connected to said rod, two force transmitting elements operatively connected to said two-way power flow dividing device, one of said force transmitting elements being connected to said sickle bar and the other of said elements being connected to said support bar, and power flow diminishing brake means operatively connected to each of said force transmitting means.

4. The combination with a mobile vehicle frame, of a support bar pivotally connected to said frame, a sickle bar pivotally connected to said support bar, a hydraulic ram mounted on said frame, said ram having a cylinder, a piston operating therein, and a piston rod, a two-way power flow dividing device operatively connected to said rod, two force transmitting elements operatively connected to said two-way power flow dividing device, one of said force transmitting elements being connected to said sickle bar and the other of said elements being connected to said support bar, and power flow diminishing brake means operatively connected to each of said force transmitting means, said power flow dividing device comprising a pulley mounted on said piston rod, said force transmitting elements comprising an elongated flexible tension member looped over said pulley.

5. The combination with a mobile vehicle frame, of a support bar pivotally connected to said frame, a sickle bar pivotally connected to said support bar, a hydraulic ram mounted on said frame, said ram having a cylinder, a piston operating therein, and a piston rod, a two-way power flow dividing device operatively connected to said rod, two force transmitting elements operatively connected to said two-way power flow dividing device, one of said force transmitting elements being connected to said sickle bar and the other of said elements being connected to said support bar, and power flow diminishing brake means operatively connected to each of said force transmitting means, said power flow dividing device comprising a pulley mounted on said piston rod, said force transmitting elements comprising an elongated flexible tension member looped over said pulley, said brake means comprising rotatable drum means about which said tension member is windable, and manually operable means for controlling the rotation of said drum means.

GEORGE W. IVERSON.

REFERENCES CITED

The following references are of record in the file of this patent:

UNITED STATES PATENTS

| Number | Name | Date |
|---|---|---|
| 248,683 | Worth | Oct. 25, 1881 |
| 395,681 | Aitken | Jan. 8, 1889 |
| 498,655 | Ivens | May 30, 1893 |
| 623,079 | Ellingwood | Apr. 11, 1899 |
| 909,280 | Camp | Jan. 12, 1909 |
| 1,810,680 | Rothgarn | June 16, 1931 |
| 2,292,962 | Mott | Aug. 11, 1942 |
| 2,304,421 | Rogers | Dec. 8, 1942 |
| 2,308,175 | Honig | Jan. 12, 1943 |
| 2,310,387 | Blair et al. | Feb. 9, 1943 |
| 2,320,953 | Shenstone | June 1, 1943 |
| 2,324,563 | Custenborder | July 20, 1943 |
| 2,328,838 | Oberlink | Sept. 7, 1943 |